US008604423B2

(12) United States Patent
Enke et al.

(10) Patent No.: US 8,604,423 B2
(45) Date of Patent: Dec. 10, 2013

(54) METHOD FOR ENHANCEMENT OF MASS RESOLUTION OVER A LIMITED MASS RANGE FOR TIME-OF-FLIGHT SPECTROMETRY

(75) Inventors: Christie G. Enke, Placitas, NM (US); Steven J. Ray, Bloomington, IN (US); Alexander W. Graham, Bloomington, IN (US); Gary M. Hieftje, Bloomington, IN (US); Elise Dennis, Bloomington, IN (US); Charles J. Barinaga, West Richland, WA (US); David W. Koppenaal, Richland, WA (US)

(73) Assignees: Indiana University Research and Technology Corporation, Indianapolis, IN (US); Battelle Memorial Institute, Richland, WA (US)

( * ) Notice: Subject to any disclaimer, the term of this patent is extended or adjusted under 35 U.S.C. 154(b) by 0 days.

(21) Appl. No.: 13/639,257

(22) PCT Filed: Apr. 5, 2011

(86) PCT No.: PCT/US2011/031300
§ 371 (c)(1),
(2), (4) Date: Oct. 4, 2012

(87) PCT Pub. No.: WO2011/127091
PCT Pub. Date: Oct. 13, 2011

(65) Prior Publication Data

US 2013/0020482 A1 Jan. 24, 2013

Related U.S. Application Data

(60) Provisional application No. 61/321,002, filed on Apr. 5, 2010.

(51) Int. Cl.
*H01J 49/26* (2006.01)
*H01J 49/40* (2006.01)
*B01D 59/44* (2006.01)

(52) U.S. Cl.
USPC ........... 250/287; 250/281; 250/282; 250/288; 315/111.61; 315/111.81

(58) Field of Classification Search
None
See application file for complete search history.

(56) References Cited

U.S. PATENT DOCUMENTS 3,397,311 A 8/1968 Saari et al.
3,610,922 A 10/1971 Werner (Continued)

FOREIGN PATENT DOCUMENTS

WO 20011027971 A1 4/2001
WO 20041021386 A2 3/2004

OTHER PUBLICATIONS

PCT International Search Report and Written Opinion completed by the U.S. Searching Authority on May 24, 2011 and issued in connection with PCT/US2011/031300.

(Continued)

*Primary Examiner* — Nikita Wells
(74) *Attorney, Agent, or Firm* — Barnes & Thornburg LLP

(57) ABSTRACT

Novel methods and instrumentation for mass spectrometry are described. Zoom-time of flight mass spectrometry (Zoom-TOF) allows increased mass resolution over a predetermined specific range of masses. Methods for retrofitting traditional time-of-flight (TOF) and distance of flight (DOF) mass spectrometers are described, as well as novel instruments capable of performing Zoom-TOF analyses.

14 Claims, 9 Drawing Sheets

(56) References Cited

U.S. PATENT DOCUMENTS

| | | | | |
|---|---|---|---|---|
| 4,472,631 | A * | 9/1984 | Enke et al. | 250/281 |
| 4,855,594 | A | 8/1989 | Kimock et al. | |
| 5,065,018 | A | 11/1991 | Bechtold et al. | |
| 5,614,711 | A | 3/1997 | Li et al. | |
| 6,153,880 | A | 11/2000 | Russ, IV et al. | |
| 6,489,610 | B1 | 12/2002 | Barofsky et al. | |
| 6,590,206 | B1 | 7/2003 | Evrard | |
| 6,674,069 | B1 | 1/2004 | Martin et al. | |
| 6,933,497 | B2 | 8/2005 | Vestal | |
| 6,949,738 | B2 | 9/2005 | Yamaguchi et al. | |
| 7,041,968 | B2 * | 5/2006 | Enke | 250/282 |
| 7,385,188 | B2 | 6/2008 | Funsten et al. | |
| 7,429,728 | B2 * | 9/2008 | Enke | 250/282 |
| 7,498,585 | B2 | 3/2009 | Denton et al. | |
| 7,947,950 | B2 * | 5/2011 | Enke et al. | 250/290 |
| 2004/0036029 | A1 | 2/2004 | Bertsch | |
| 2005/0040326 | A1 | 2/2005 | Enke | |
| 2006/0138318 | A1 | 6/2006 | Enke | |
| 2008/0017792 | A1 | 1/2008 | Enke et al. | |
| 2008/0087814 | A1 | 4/2008 | Loucks | |
| 2013/0092832 | A1 * | 4/2013 | Enke et al. | 250/282 |

OTHER PUBLICATIONS

PCT International Search Report and Written Opinion completed by the U.S. Searching Authority on Aug. 12, 2011 and issued in connection with PCT/US2011/034933.
PCT International Search Report and Written Opinion completed by the U.S. Searching Authority on Jul. 13, 2012 and issued in connection with PCT/US2012/033761.
Enke, Christie G., and Gareth S. Dobson. "Achievement of energy focus for distance-of-flight mass spectrometry with constant momentum acceleration and an ion mirror." Analytical chemistry 79.22 (2007): 8650-8661.
T. Matsuo and Y. Seyama, Introduction to Modern Biological Mass Spectrometry, J. Mass Spectrom. 35 (2000), pp. 114-130.
C.E. Costello, Bioanalytical Applications of Mass Spectrometry, Anal. Biotechnol. 10 (1999), pp. 22-28.
W.C. Wiley and I.H. McLaren, Time-of-Flight Mass Spectrometer with Improved Resolution, Rev. Sci. Instrum. 26 (1955), pp. 1150-1157.
M. Karas, U. Bahr, I. Fournier, M. Gluckmann and A. Pfenninger, The Initial-Ion Velocity as a Marker for Different Desorption-Ionization Mechanisms in MALDI, Int. J. Mass Spectrom. 226 (2003), pp. 239-248.
M. Guilhaus, D. Selby and V. Mlynski, Orthogonal Acceleration Time-of-Flight Mass Spectrometry, Mass Spectrom. Rev. 19 (2000), pp. 65-107.
R.J. Cotter, Time-of-Flight Mass Spectrometry: Instrumentation and Applications to Biological Research, Am. Chem. Soc. (1997) Washington, DC, Chap II.
D. Ioanoviciu, Ion-Optical Solutions in Time-of-Flight Mass Spectrometry, Rapid Commun. Mass Spectrom. 9 (1995), pp. 985-997.
M.M. Wolff and W.E. Stephens, A Pulsed Mass Spectrometer with Time Dispersion, Rev. Sci. Instrum. 24 (1953), pp. 616-617.
W.P. Poschenrieder, Multiple-Focusing Time of Flight Mass Spectrometers: I. TOFMS with Equal Momentum Acceleration, Int. J. Mass Spectrom. Ion Phys. 9 (1971), p. 357.
D. Ioanoviciu, Delayed Extraction-Constant Momentum Time-of-Flight Mass Spectrometry, Nucl. Instrum. Methods Phys. Res. A 427 (1999), pp. 157-160.
D. Ioanoviciu, Perfect Velocity Focusing in Hyperbolic Electrode Source-Drift Space Time-of-Flight Mass Analyzers, Rapid Commun. Mass Spectrom. 12 (1999), pp. 1925-1927.
B.D. Gardnera and J.F. Holland, Nonlinear Ion Acceleration for Improved Space Focusing in Time-of-Flight Mass Spectrometry, J. Am. Soc. Mass Spectrom. 10 (1999), pp. 1067-1073.
I.V. Chernushevich, A.V. Loboda and B.A. Thomson, An Introduction to Quadrupole-Time-of-Flight Mass Spectrometry, J. Mass Spectrom. 36 (2001), pp. 849-865.
A. Shevchenko, A. Loboda, A. Shevchenko, W. Ens and K.G. Standing, Maldi Quadrupole Time-of-Flight Mass Spectrometry: A Powerful Tool for Proteomic Research, Anal. Chem. 72 (2000), pp. 2132-2141.
M. Vestal, P. Juhasz, W. Hines and S. Martin, An Improved Delayed Extraction MALDI-TOF MS for PSD and CID (1998) Proceedings of the 46th ASMS Conference on Mass Spectrometry and Allied Topics, Orlando, FL.
D. Katz and D. Barofsky, A New Design for a MALDIi Tandem Time-of-Flight Mass Spectrometer (1999) Proceedings of the 47th ASMS Conference on Mass Spectrometry and Allied Topics, Dallas, TX.
K.F. Medzihradszky, J.M. Campbell, M.A. Baldwin, A.M. Falick, P. Juhasz, M.L. Vestal and A. Burlingame, The Characteristics of Peptide Collision-Induced Dissociation Using a High-Performance MALDI-TOF/TOF Tandem Mass Spectrometer, Anal. Chem. 72 (2000), pp. 552-558.
C.K.G. Piyadasa, P. Hakansson, T.R. Ariyaratne and D.F. Barofsky, A high Resolving Power Ion Selector for Post-Source Decay Measurements in a Reflecting Time-of-Flight Mass Spectrometer, Rapid Commun. Mass Spectrom. 12 (1998), pp. 1655-1664.
A.L. Yergey, J.R. Coorssen, P.S. Backlund Jr., P.S. Blanck, G.A. Humphrey, J. Zimmergerg, J.M. Campbell and M.L. Vestal, De Novo Sequencing of Peptides Using MALDI/TOF-TOF, J. Am. Soc. Mass Spectrom. 13 (2002), pp. 784-791.
C. Costa-Vera, R. Zubarev, H. Ehring, P. Håkansson and B.U.R. Sunqvist, A Three-point Calibration Procedure for Matrix Assisted Laser Desorption/Ionization Mass Spectrometry Utilizing Multiply Charged Ions and Their Mean Initial Velocities, Rapid Commun. Mass Spectrom. 10 (1996), pp. 1429-1432.
M. Glückmann and M. Karas, The Initial Ion Velocity and its Dependence on Matrix, Analyte, and Preparation Method in Ultraviolet Matrix-Assisted Laser Desorption/Ionization, J. Mass Spectrom. 34 (1999), pp. 467-477.
C. Hack and W.H. Benner, A Simple Algorithm Improves Mass Accuracy to 50-100 ppm for Delayed Extraction Linear Matrix-Assisted Laser Desorption/Ionization Time-of-Flight Mass Spectrometry, Rapid Commun. Mass Spectrom. 16 (2002), pp. 1304-1312.
D. L. Albritton, T. M. Miller; D. W. Martin, E. W. McDaniel, Physical Review 171 (94): 94-102 (1968).
Mamyrin, B. A., Karataev, V. I., Shmikk, D. V., Zagulin, V. A., "The Mass-Reflectron, a New Nonmagnetic Time-of-Flight Spectrometer with High Resolution" Sov. Phys. JETP 37 (1973).
T. Kim, H.R. Udseth, and R.D. Smith, Anal. Chem. 72, 5014, (2000).

* cited by examiner

METHOD FOR ENHANCEMENT OF MASS RESOLUTION OVER A LIMITED MASS RANGE FOR TIME-OF-FLIGHT SPECTROMETRY

CROSS-REFERENCE TO RELATED APPLICATIONS

This application is a U.S. national counterpart application of international application serial No. PCT/US2011/031300, filed Apr. 5, 2011, which claims the benefit of U.S. Provisional Patent Application No. 61/321,002, filed on Apr. 5, 2010. The entire disclosures of PCT/US2011/031300 and U.S. Provisional Patent Application No. 61/321,002 are herein incorporated by reference.

STATEMENT REGARDING FEDERALLY SPONSORED RESEARCH OR DEVELOPMENT

This invention was made with government support under Grant No. DE-AC05-76RL01830 awarded by the DOE-Battelle Prime Contract for the Mgt. and Operation of Pacific NW Natl. Lab. The Government has certain rights in the invention.

TECHNICAL FIELD

The present disclosure relates to mass spectrometry; in particular, the present disclosure relates to devices and methods for analyzing the mass to charge ratio of gaseous ions.

BACKGROUND AND SUMMARY

Mass spectrometers generally include an ion source, which provide gas phase ions, a mass analyzer, which disperses the ions according to their mass-to-charge ratio (m/z) by applying electromagnetic fields, and a detector, which quantifies the abundance of the ions. Conventional time-of-flight (TOF) mass spectrometers (MS) are based on the difference in velocity attained by ions of different m/z when they are accelerated in a vacuum by an electric field. For time-of-flight mass spectrometry, the common arrangement for the measurement of this velocity is to place a detector at the end of the flight path and determine the time required for the ion to reach the detector after acceleration. So, for a distance (d) between the acceleration region and the detector and a flight time (t) of between the time of acceleration and detection, the velocity (v) will be v=d/t. Since the distance is the same for all ions, their arrival times are different with the smaller m/z ions arriving first and the larger m/z ions later. The dispersion in flight times according to the m/z provides this technique with its name, "time-of-flight" mass spectrometry.

The devices and methods described herein use ion optics to disperse ions according to their mass to charge ratio, wherein over a limited range of mass to charge ratios, the ion optics and the manner in which they are switchable enable enhanced mass resolution compared to conventional time-of-flight or distance-of-flight mass spectrometers. Mass resolution is generally limited by the physical dimensions of the mass spectrometer. The achievement of higher resolution in time-of-flight mass spectrometry (TOFMS) requires longer flight paths, but is accompanied by the concomitant loss of spectral-generation rate, duty factor/cycle, and thus, sensitivity and precision. In addition, it is appreciated herein that the cost of instruments goes up dramatically with each increment of improved mass resolution. It has been discovered that the devices and methods described herein, also referred to as Zoom-TOF, a substantial increase in resolution, sensitivity, and precision may be realized with no significant increase in size or cost of the instrument. Furthermore, Zoom-TOF may be implemented on existing TOFMS instruments or provided as a feature in new instruments at low cost. Alternatively, a significantly smaller-package TOF instrument can be designed with Zoom-TOF capability that offers equivalent performance to more conventional-size instruments.

DETAILED DESCRIPTION

Figure 1:
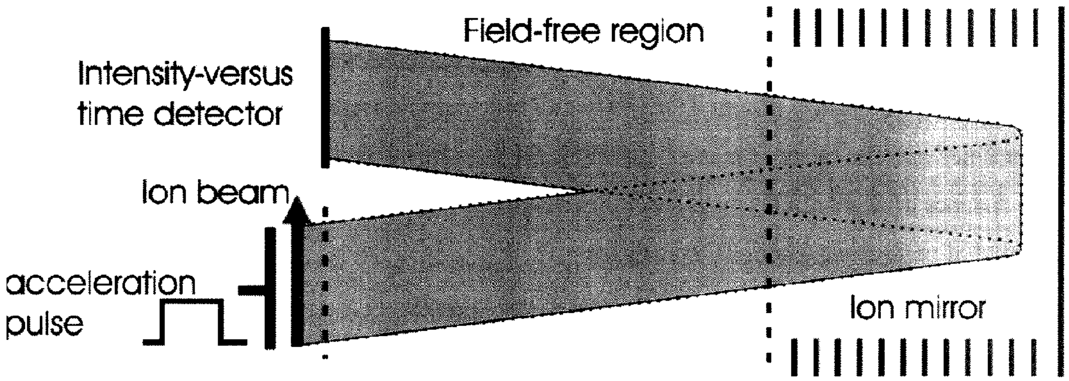
FIG. 1 is a schematic representation of a time-of-flight mass spectrometer (TOFMS) for high-resolution mass spectrometry, wherein the use of constant momentum acceleration enables energy-focusing of ions over a limited m/z range at the arrival-time detector.

Several illustrative embodiments of the invention are described by the following enumerated clauses:

1. A multi-mode mass spectrometer comprising an ion accelerator, an ion minor, and an ion detector, wherein in a first mode, the mass spectrometer is configured so that the ions are accelerated with constant momentum and in a second mode, the mass spectrometer is configured so that the ions are accelerated with constant energy.

2. The mass spectrometer of clause 1 wherein the first mode and the second mode are switchable.

3. The mass spectrometer of clause 1 or 2 wherein the ions are accelerated from an extraction region from a substantially orthogonal ion beam.

4. The mass spectrometer of any one the preceding clauses further comprising a quadrupole doublet, where the quadrupole doublet is configured to focus an ion beam in two dimensions prior to the accelerator.

5. The mass spectrometer of any one the preceding clauses wherein the quadrupole doublet is polarized using a direct current.

6. The mass spectrometer of any one the preceding clauses wherein the first quadrupole of the quadrupole doublet is configured to transform the ion beam from three dimensions into substantially two dimensions.

7. The mass spectrometer of any one the preceding clauses wherein the second quadrupole of the quadrupole doublet is configured to decrease ion loss from the ion beam in two substantially orthogonal directions.

8. The mass spectrometer of any one the preceding clauses wherein the ion mirror is configured to deflect the ions with a linear field in the first mode.

9. The mass spectrometer of any one the preceding clauses wherein the ion mirror is configured to deflect the ions with a conventional field in the second mode.

10. The mass spectrometer of any one the preceding clauses wherein the ion mirror is configured to deflect the ions towards the ion detector in a collimated beam in the first mode.

11. The mass spectrometer of any one the preceding clauses wherein the ion mirror is configured to deflect the ions towards the ion detector in a focused beam in the second mode.

12. The mass spectrometer of any one the preceding clauses wherein in the first mode the ions are included in a predetermined range of mass/charge.

13. The mass spectrometer of any one the preceding clauses wherein in the second mode the ions are included in a predetermined range of mass/charge.

14. The mass spectrometer of any one the preceding clauses wherein the detector is a time of flight detector.

15. The mass spectrometer any one the preceding clauses wherein the extraction region comprises a plurality of parallel planar elements selected from the group consisting of:

a rear repeller element having a solid or gridded middle section;

an intermediate element having a gridded middle section;

an exit element having a gridded middle section;

one or more additional intermediate elements; and combinations thereof;

wherein insulating spacers set the distance between each of the elements; and the planar elements are in electrical communication via a series of resistors having the voltage applied to the gridded intermediate element selectable by the operator or system.

16. A method for analyzing the mass of a sample, the method comprising the steps of ionizing the sample into ions;

accelerating at least a portion of the ions with constant energy;

detecting the ions;

accelerating a range of ions having a predetermined mass/charge with constant momentum; and detecting the range of ions.

17. The method of clause 16 further comprising the steps of reflecting the ions with constant energy using an ion mirror having a conventional field; and reflecting the ions with constant momentum using an ion mirror having a linear field.

19. A method for analyzing the mass of a sample using the mass spectrometer of any one of clauses 1-15.

In one illustrative embodiment, the present disclosure provides methods and apparatus for enhancing the mass resolution over a limited mass range for time-of-flight (TOF) mass spectrometry. Accordingly, the disclosed methods and apparatus provide users and manufacturers of time-of-flight instruments with a means for increasing their instrument's usual mass resolution over a limited range of masses of their choice, without sacrificing speed, duty factor, or sensitivity. This is of particular value when there is a need to discriminate among ions with the same nominal (or unit) mass value. The ability to discriminate among ions whose masses differ by fractional mass to within only a few parts per million ("exact mass" mass spectrometry) enables the determination of molecular formulae and the rejection of spectrally interfering substances (i.e. substances with the same nominal mass) in an analysis. Improved mass resolution is a highly sought capability in all forms and applications of mass spectrometry. Furthermore, by limiting the mass range, the time response and duty factor of the TOFMS can be significantly improved.

According to one illustrative embodiment, rather than employing an array of detectors along the flight path as ordinarily used with distance-of-flight mass spectrometry (DOFMS), the presently disclosed method employs a single detector at the end of the flight path. This method, referred to herein as Zoom-TOF mass spectrometry, allows one to achieve space and energy focus for any given m/z ion at that specific distance and flight time using DOFMS focus principles. If one uses the arrival time detection system common to TOFMS for ions thus focused, the ions will be better focused than with conventional TOFMS due to the tighter spatial focus and the energy focus attending the DOFMS focus method. Thus the packet of isomass ions or range of mass/energy ions will arrive at the detector over a shorter-than-normal time span, producing narrower peaks with wider separation. Ions that are somewhat lighter will arrive slightly sooner and ions a that are somewhat heavier will arrive later. Focus for these lighter and heavier ions may not be quite as good as with traditional systems, but the overall resolution over a limited m/z range will be improved over conventional TOFMS performed on the same platform. Thus, the methods described herein provide amplified resolution within a narrow mass window.

The Zoom-TOF strategy can also be used to improve the sensitivity and speed of the TOFMS in which it is installed. In a typical TOFMS, the rate with which consecutive mass spectra can be generated (spectral generation rate) is limited by the flight time of the heaviest m/z of interest. Thus, the sensitivity, precision, and temporal response of the instrument are a function of the mass range of the instrument, and are often limited by the mass range of the ions that are created by a particular ionization source. However, when the instrument is operated in Zoom-TOF mode, the m/z range investigated is necessarily much smaller. Thus, consecutive mass spectra can be generated at a much greater rate, improving the temporal response of the instrument. Further, as a consequence of the increase in the spectral generation rate, it becomes possible to sample a larger fraction of the continuous ion beam into the mass analyzer, thus improving the duty factor, sensitivity, and precision of the analysis. Thus, the Zoom-TOF technique will permit a small section of the mass spectrum to be observed with higher resolving power, with higher temporal resolution, and with greater sensitivity and precision, all at a higher sample/analyte utilization efficiency (Improving the resulting analyses for sample- or analyte-poor situations).

According to one illustrative embodiment, the Zoom-TOF instrument follows conventional TOFMS design, which includes a means of creating gaseous ions of the analyte of interest (either a beam of ions created externally to the acceleration region by any means or a desorption ionization, electron impact, or other ionization means occurring within the acceleration region), an acceleration region for ion acceleration into the flight path, an ion mirror and a detector or set of detectors suitable for providing data on the ion signal at each relevant flight time. Other elements such as beam-forming optics, background-gas separation, prior m/z separation devices such as quadrupole or time-of-flight analyzers, and ion reaction and fragmentation cells can be incorporated into the instrument design and would typically be placed prior to the TOFMS apparatus. It is to be understood that such additional elements are not limited in any way, and include all commercially available components for such purposes.

In illustrative embodiments, the present disclosure describes a mass spectrometer providing high resolution mass spectra without extending flight times. Accordingly, the present disclosure provides methods and apparatuses for increased mass resolution while maintaining spectral generation rates.

In another illustrative embodiment, an extraction region that accomplishes rapid switching between conventional TOF and Zoom-TOF operation is incorporated. This extraction region should also be well-suited to the somewhat different demands of constant energy and constant momentum acceleration. In constant energy acceleration, it is desirable to have a short acceleration region across which a high-voltage acceleration pulse is applied. The acceleration pulse is kept on until the highest m/z ion of interest has left the source. In constant momentum acceleration, the acceleration pulse must terminate before the lowest m/z ion of interest has left the source. To achieve adequate constant momentum acceleration, it is desirable to have an extraction region that is fairly deep to provide space for a suitable acceleration. In this source, it is also important that the field be uniform. An exemplary switchable extraction region is shown in FIG. 7.

Figure 7:
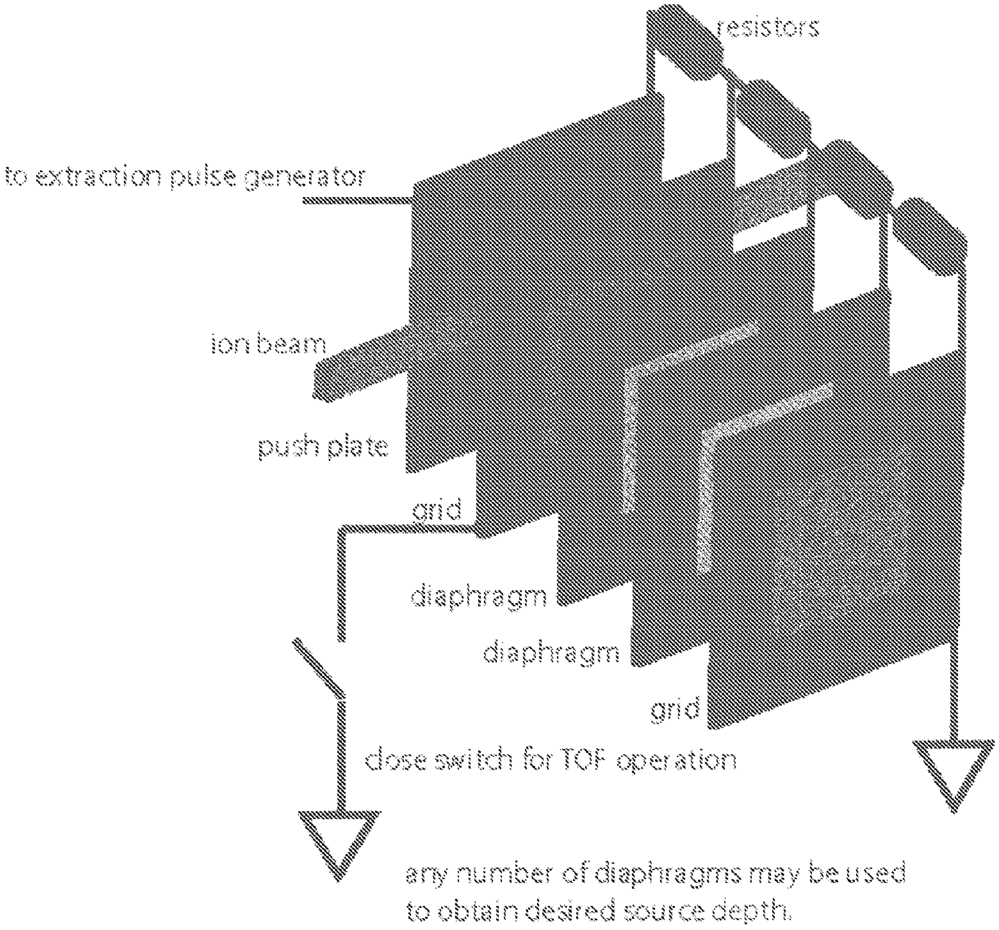
FIG. 7 is a schematic representation of an exemplary extraction region for a Zoom-TOF mass spectrometer.

It is understood that the ion accelerator embodiment described in FIG. 7 is not the only means for providing constant momentum acceleration or constant energy acceleration. In another embodiment constant momentum acceleration or constant energy acceleration of the sample ions can be accomplished with a tailored acceleration pulse (i.e. duration of the pulse, or shape of the pulse, or a combination thereof).

Each element in the extraction region is made of a rigid but relatively thin electrically conducting material, typically stainless steel. These planar elements generally have an open center that, in the stack, comprises the interior volume of the extraction region. The rear element, which is the repeller, is generally solid in the middle, though it can be gridded in case one desires ions of the opposite polarity to be ejected in this direction. Most of the other elements are open in the center except one intermediate element and the exit element, which are gridded. The elements are held in this arrangement by insulating spacers that set the distance between the elements. The resistors in the voltage divider are attached directly to or are positioned near the elements to which they are connected. The relative magnitude of the resistors and the relative length of the spacers determine the shape of the electric field that exists when a voltage is applied to the repeller (rear) element relative to the exit (front) element. For a uniform field, the spacers are of equal length and the resistors of equal value.

An incoming ion beam traverses the rear section of the extraction region. A segment of this beam is accelerated toward the focusing and mass analyzer sections of the mass spectrometer when a voltage is applied to the repeller element. Equally, the ions may be formed from the sample in this part of the extraction region by means such as electron ionization or laser desorption or other means.

In constant momentum mode, the switch is open and an accelerating field exists in the entire region between the repeller plate at the rear and the exit grid at the front. The shape of this field will depend on the voltages applied to each element. If the voltage applied to each element is proportional to the fraction of the distance the element is between the repeller plate and the exit grid, the field will be uniform. Non-linear field shapes are possible, but would not result in perfect constant momentum acceleration.

In constant energy operation, the switch is closed and the entire extraction pulse voltage appears between the repeller (rearmost) element and the intermediate grid, while the remainder of the source, forward of the intermediate grid, will be field-free. In other words, in this operation, the acceleration field exists only in the region between the repeller plate and the intermediate gridded element. If one desires a field in the forward region, the other side of the switch can be connected to a voltage different from that of the exit grid, a situation that will produce a field in this region. Such a source is called a two-field source and is used to affect the space focus distance from the source.

In another embodiment, the same switching concept is used for the ion mirror as is described for the source (i.e. the extraction region). A two-stage mirror has a gridded element at the entrance/exit and another gridded element behind it. These two elements are followed by a series of open-aperture elements until one arrives at the rear plate or grid. The voltage on the second gridded element can be switched between that which forms a uniform field between the back plate and the front grid (used for constant momentum acceleration) and that which forms the desired two-field configuration preferred for constant energy acceleration.

It will be appreciated that stacked disc optical elements are well known in mass spectrometry and are often used for the creation of uniform or specially shaped electric fields within the space they enclose. They are used as the ion mobility dispersion device in ion mobility mass spectrometry (D. L. Albritton, et al., 1968) and to create ion mirrors (Mamyrin, et al., 1973) and Cotter, Time-of-Flight Mass Spectrometry, ACS Books, Washington, D.C. (1997). With alternating voltages applied between adjacent diaphragms, they are used as ion transmission devices (Kim et al. 2000). In one implementation, a stacked ring set with a uniform field is used as the entire flight path in a time-of-flight mass spectrometer (Funsten, U.S. Pat. No. 7,385,188 B2). In another case, a stacked ring system was used as a constant energy ion acceleration region without grids for a time-of-flight mass spectrometer (Bechthold, U.S. Pat. No. 5,065,018).

In an illustrative embodiment, a method of mass spectrometry comprising: creating gaseous ions of an analyte of interest; accelerating the ions by constant momentum acceleration or constant energy acceleration as the operator or system selects; reflecting the ions with an ion mirror; and detecting the reflected ions with a high temporal resolution detector is described.

In another illustrative embodiment, a mass spectrometer comprising: means for creating gaseous ions of an analyte of interest; an acceleration region for ion acceleration by constant momentum or constant energy into a flight path; an ion mirror; and a high temporal resolution detector is described.

In another illustrative embodiment, an extraction region for a mass spectrometer comprising: a plurality of parallel planar elements comprising: a rear repeller element having a solid or gridded middle section; an intermediate element having a gridded middle section; an exit element having a gridded middle section; and a plurality of intermediate elements; wherein insulating spacers set the distance between each of the elements; and the planar elements are in electrical communication via a series of resistors having the voltage applied to the gridded intermediate element selectable by the operator or system is described.

Currently, time-of-flight mass spectrometers (TOFMS) are among the most popular and widely used forms of mass analyzers. One factor contributing to their popularity is their high spectral generation rate. Another factor is their high mass resolution, especially for ions of high molecular weight. While TOFMS is known for both high resolution and high spectral rate, conventional instruments provide increasing mass resolution with decreasing spectral generation rate, and vice versa. The present disclosure relates to a mass spectrometer providing high resolution while maintaining high spectral generation rate. This is accomplished by increasing the resolution over limited mass ranges using a multi-modal mass spectrometer. According to the present disclosure, a conventional TOFMS spectrum can be obtained with relatively lower resolution, while contemporaneously or switchably one or more zoomTOF spectrum can be obtained to focus on those regions of particular interest. As a result, the instrument provides a first spectrum of a broad mass range with relatively lower mass resolution and a second spectrum of a narrow mass range with a much higher mass resolution.

TOFMS does not scan the spectrum like quadrupole, ion-trap and most sector mass analyzers. Furthermore, most ions entering the drift region are detected. TOF thus has an intrinsic duty-cycle advantage over quadrupole, ion-trap and most sector mass analyzers. As used herein, the duty cycle of the spectrometer is the fraction of ions originally in the continuous ion beam that is converted into the ion packets for analysis.

For sector or quadropole instruments, there are fundamental limits to the scan times due to transit times of ions. The control of the fields becomes technically difficult beyond about 5 spectra per second (5 Hz). Because TOFMS does not scan, there are fewer limitations for the spectral acquisition rate. As such, TOFMS is often described as fast. For example, a spectrum from a single shot of ions can be acquired in about 100 μs or less. However, it is rare that only a single shot generates sufficient ions to give a good statistical representation of the distribution of m/z in the shot. A good statistical representation is usually provided by signal averaging until a few thousand ions have been detected. If 100 ions are produced for an average ion shot, then 100 shots will produce a good spectrum. If 1000 ions are produced in a shot then 10 shots may produce a spectra showing a good statistical representation. As such, TOFMS spectra are typically acquired at 10-100 Hz.

The flight time of the heaviest ion in the spectrum also influences the acquisition rate. When analyzing large mass ranges including large ions, the rate is lower. The method for forming the ion packets also influences the spectral collection rate. For example, laser desorption uses a laser source that pulses at a given frequency, that pulse frequency may limit the spectral generation rate. With continuous ion sources, the upper limit may be imposed by the speed at which the digitizer can signal average.

TOFMS are typically sold as single-stage mass spectrometers with virtually all forms of sample ionization and in hybrid instruments (e.g. TOF-TOF) where they perform the second stage of analysis in tandem mass spectrometers. They are also commonly coupled to preliminary forms of complex-sample separation, such methods including gas chromatography, liquid chromatography, capillary electrophoresis, ion mobility spectrometry, and others (e.g. GC-MS).

Referring to FIG. 1, shown is a schematic representation of a time-of-flight mass spectrometer (TOFMS) for high-resolution mass spectrometry. As with most time-of-flight mass spectrometers used for sampling ions from a continuous atmospheric-pressure or reduced-pressure source are operated in the "orthogonal acceleration" or "right-angle extraction" mode such as shown in FIG. 1.

Remarkable resolution in the tens of thousands has been achieved with time-of-flight mass spectrometers (TOFMS) through the use of orthogonal acceleration of the initial analyte ion beam, delayed extraction, an ion mirror, and high temporal resolution detectors and electronics, as shown in FIG. 1. TOFMS instruments have all but replaced magnetic/electric sector mass spectrometers for routine high-resolution analysis at elevated mass-to-charge ratios. However, TOFMS resolution is still limited by the means by which ions with the same mass but with differing initial placement and motion can be brought to the detector at the same time.

Particularly troublesome in TOFMS is the time required for ions initially headed in the "wrong" direction to turn around to the direction of ion acceleration. Orthogonal acceleration of an initial ion beam has reduced this problem, but not eliminated it. It is widely accepted that the ability to expand the m/z scale in particular regions would be a very attractive feature in a TOFMS. The usual method of improving TOFMS resolution is to lengthen the flight path. This approach has the disadvantages of reducing the rate of spectral generation and, for a continuously operating ion source, of reducing duty factor and hence signal-to-noise ratio.

Most TOF mass spectrometers used today in analytical applications function in what is referred to as constant-energy mode. This condition assures that essentially the same amount of work is performed, irrespective of individual mass, on all ions in the ensemble and, therefore, that they acquire, on average, the same kinetic energy. The m/z values of the ions can be determined, therefore, simply by measuring their successive transit times over some fixed drift distance through a flight tube to a detector. Variations around the average flight time of a set of ions having a given m/z value reflect mainly the ions' distributions in space and velocity before acceleration. When ions originate from an electrode in an accelerating region as a result, for example, of having irradiated a sample with a short burst of photons or energetic particles, their initial time and spatial distributions along the direction of acceleration are narrow, but their initial distribution in velocity is broad and somewhat mass-dependent [Karan, et al., 2003]. When ions are produced in an external ion source, for example by electrospray ionization (ESI) or atmospheric pressure matrix-assisted laser desorption/ionization (MALDI), and transported orthogonally into the acceleration region [Guilhaus, et al., 2000], their initial time and velocity distributions along the direction of acceleration are narrow, but their initial spatial distribution is broad. Correction for either the wide velocity distribution in the former case or the wide spatial distribution in the latter case can be achieved to some degree by using two stages of acceleration [Wiley, et al., 1955]. The distance between the acceleration electrodes, the magnitudes of the accelerating potentials, and the timing and duration of voltage switching depend on whether the dual-stage accelerator is being used to correct for an initial velocity or spatial distribution. It is also possible for a TOF mass spectrometer to be operated in a constant-momentum mode. Constant momentum TOF MS was first demonstrated in 1953 by Wolff and Stephens.

A new form of mass spectrometer called "distance-of-flight" (DOF) has been described in U.S. Pat. Nos. 7,041,968 and 7,429,728 and U.S. Patent Application US 2008/0017792A1, the entirety of the disclosure of each of the foregoing is herein incorporated by reference. In such DOF spectrometers, ions are accelerated by constant momentum acceleration, are reflected by an ion mirror (reflectron) and fly parallel to an array detector surface. After leaving the ion mirror, the ions are separated in distance according to their mass to charge ratio (m/z). At a specific time, they are deflected from their flight path (by the push plate) to the array detector. Each detector position receives an amount of charge proportional to the number of ions having the m/z value associated with the detector's position.

In constant-momentum mode, a collection of ions, such as a collection of ions having a predetermined range of mass/charge, is accelerated for some fixed time. If the extraction pulse is on when the last of the ions pass through the exit grid into the field free region, they will have acquired constant energies. However, if the extraction pulse is turned off before any of the ions reach the exit grid, the same impulse is performed on all ions, irrespective of individual mass and, therefore, they will have acquired the same change in momentum. The linear mass-dependent velocity can be used to determine the m/z values of the ions by measuring their flight times over some fixed drift distance. The linear mass dispersion doubles the mass resolving power of ions accelerated with space-focusing conditions in constant momentum mode. Besides, the mass-dependent kinetic energy can be exploited to disperse ions according to mass in a simple kinetic energy filter.

Correction for an initial distribution of velocities or starting positions using constant-momentum acceleration in a uniform electric field is impossible because the kinetic energies of all ions of the same mass are increased in this acceleration mode by exactly the same amount regardless of their initial starting positions. Use of a two-stage ion reflector has been proposed as a means for correcting an initial velocity distribution in a homogeneous single-field ion source operated in a constant-momentum acceleration mode, but no practical device seems to have been built yet.

Accordingly, in DOFMS, ions are accelerated along a flight path with m/z-dependent velocities, but instead of measuring the time to fly a given distance, one measures the distance flown in a given time. The criteria for focusing of the ions at their respective distances require focus at the same time, rather than at the same distance. Ions can be energy-focused at the same time along the flight path through the use of an ion mirror and constant-momentum acceleration out of the extraction region. Spatial dispersion is not focused. However, an initial ion beam can be convergent into the extraction region and therefore space-focused at a particular beam flight distance. In one illustrative embodiment, a DC quadrupole doublet is provided to focus the ion beam resulting in improved spatial distribution of the ion beam in the extraction region.

A convergent beam will have greater energy dispersion in the direction of the orthogonal acceleration than a parallel beam, but when constant momentum focusing is used, the energy dispersion is focused at a specific time in the orthogonal flight. Thus, one achieves both spatial and energy focus at the focal time at the various flight distances.

An alternative to using acceleration in uniform electric fields to correct for an initial distribution in velocity or space is to use acceleration in nonlinear electric fields. Methods for using nonlinear ion acceleration to improve mass resolution have been described in conjunction with both constant-energy [Garnera, et al. 1999] and constant momentum mode [Ioanoviciu, 1999(1); Ioanoviciu, 1999(2). It has been reported that in theory, a modified quadrupole trap could serve to correct for an initial velocity distribution in a set of ions accelerated to constant-momentum; however, such an arrangement is believed to be incapable of correction for an initial spatial distribution. Accordingly, though without being bound by theory, it is believed herein that such a theoretical quadrupolar arrangement of electrodes would not permit operation in both constant-energy and constant momentum modes.

A hybrid configuration that combines the power of quadrupole and TOF analyzers (Q-TOF) has been reported [Chernushevich, et al., 2011; Shevchenko, et al., 2000]. The Q-TOF geometry, which can be used with ESI, MALDI, and other ionization processes, selects precursor ions with a high-performance quadrupole mass filter, fragments them via low-energy collision induced dissociation (CID), and analyzes the product-ions with a reflectron-TOF mass analyzer. A second form of tandem TOF mass spectrometry, dual TOF, has been reported [Vestal, et al., 1998; Katz, et al., 1999; Medzihradszky, et al., 2000]. The dual TOF geometry, which can be used with MALDI in conjunction with axial ion extraction or with ESI, MALDI, and other ionization processes in conjunction with orthogonal ion.extraction [U.S. Pat. No. 6,489,610, the disclosure of which is herein incorporated by reference], selects precursor ions by taking advantage of the inverse dependence of their velocities in the constant energy mode on the square root of their masses, fragments them via high-energy CID, and after subjecting them to a second stage of acceleration, analyzes the product ions with a reflectron-TOF mass analyzer. Accelerating the product ions to energies of the order of 20 keV before analyzing them in the second mass spectrometer stage (MS2) makes it possible to achieve high-resolution mass spectra that cover the entire mass range of the product ions and their precursor ion without stepping the voltage of the ion reflector. However, such a process is an inefficient, manual form of scanning. The possibility of building the velocity selector used in the first stage (MS1) so that it can choose precursors at resolving powers approaching 5000 as been reported [Piyadasa, et al., 1998]; however, in practice, velocity selectors in commercially available instruments are typically operated at resolving powers less than 500[Yergey, et al., 2002].

Space Focusing

In an ideal TOF analysis, the ensemble of ions would originate at the same time with zero initial velocities in a single plane in space and, subsequently, would acquire velocities that depend strictly on their respective masses. During a typical MALDI TOF analysis, the ions are created at different times with nonzero initial velocities in a small volume of space. As a result, during acceleration, the ions acquire velocities that have second and higher order dependencies on mass and other factors [Gluckman, et al., 1999]. The mass resolution, mass accuracy, and sensitivity of the subsequent mass analysis are determined in large part by the degree to which the mass spectrometer's ion optics correct for the deviations from the ideal conditions for TOF analysis. In constant-energy mode, it has become conventional to accelerate the ions in two successive, uniform electric fields to achieve space focusing on some plane along the flight axis beyond the ion source that corrects to some degree for either an initial velocity distribution or an initial spatial distributio—corrections for both initial conditions cannot be achieved simultaneously.

In the constant-momentum mode, it is impossible to correct for an initial distribution of velocities or starting positions by accelerating the ions in a uniform electric field because all ions of the same mass gain exactly the same kinetic energy regardless of their initial conditions. Corrections for one or the other of these initial conditions can be achieved, however, when the ions are subjected to acceleration in a decreasing electric field. The fundamental idea of space focusing is ions with a given mass-to-charge ratio having initial positions within a region with a higher electric field acquire higher kinetic energies when they are accelerated for a given time (constant-momentum) or for a given distance (constant-energy) in a decreasing electric field. Thus, ions initially closer to the high voltage electrode acquire higher kinetic energies than ions originally closer to the grounded grid. The initial kinetic energy distribution of ions could be converted to space distribution using a delayed extraction technique. Thus, some space focusing is achievable using the dependence of the final ion velocity on the initial position in either constant-energy or constant-momentum mode. In the constant-energy mode, the position of the space-focal plane, for ions that originate either with an initial velocity distribution from the plane of the sample plate or with an initial spatial distribution from a continuous beam entering the accelerator orthogonal to the time-of-flight axis, can be set by varying the delay of the voltage pulse used to produce the decreasing accelerating field. Alternatively, the same end can be achieved in the constant-momentum mode by varying both the delay and duration of the voltage pulse. Optimum focusing conditions depend on the characteristics of the electric field and operating conditions. It is appreciated that use of constant momentum acceleration enables energy-focusing of ions over a limited m/z range at the arrival-time detector.

Mass Resolving Power

In most experimental arrangements ions are brought to keV translational energies over a distance of a few millimeters and the time that the ions drift in a field-free region of about 1 m is much larger than the time of acceleration. The equation $$t_D = \frac{D}{\sqrt{2qV/M}}$$

therefore serves as a useful approximation to determine the approximate flight time of an ion (in the 100 μs time frame for typical conditions). In mass spectrometry it is conventional to measure resolving power by the ratio of m/*m where *m is a discernable mass difference. In TOFMS it is convenient to work in the time domain. Thus the resolving power m/*m can be measured in terms of t/*t as follows:

$$\frac{m}{\Delta m} = \frac{t}{2\Delta t}.$$

Difference in Ion Beam Focus Between Conventional TOF and ZOOM-TOF

The exact kinetic energy of each ion as it leaves the extraction region depends on the direction and magnitude of the ion's initial kinetic energy, as well as, the initial position of the ion in the source. In conventional time of flight systems, the space focus plane accounts for any initial spatial distribution of the ion packet but initial kinetic energy variation along the extraction axis cannot be accounted for. Therefore, a parallel ion beam in the extraction region is ideal for operation in CE mode. In Zoom-TOF mode, initial kinetic energy variations are accounted for at the energy focus time and the initial spatial distribution of ions in the source is also mirrored at this time. Therefore, a focused ion beam is ideal for operation in ZOOM-TOF mode. In order to switch between a parallel and focused ion beam for Zoom-TOF the electrostatic potentials applied to the ion optics chain are also alternated.

However, the instrument differs from the usual TOFMS design in that the acceleration region is suitable for both constant-energy or constant-momentum acceleration, and the ion mirror is able to be switched from a field arrangement typical of conventional TOFMS to one with a single region of constant field strength. In addition, electronic control for setting the specific m/z value around which the resolution amplification will take place and resetting all the instrument parameters that are needed for switching between Zoom mode and conventional TOF mode is provided. These parameters include, but are not limited to, the beam-forming optics prior to the acceleration region, the acceleration pulse voltage and duration, and the mirror voltages and field distribution. In one embodiment, the extraction zone from which ion packets are sent into the TOFMS flight tube is extended.

Those ions which exit the extraction region prior to the end of the extraction pulse (τ) are accelerated to a constant energy; and therefore have flight times which are quadratically related to m/z (labeled CEA). Ions of comparatively greater m/z do not exit the extraction region in that time, and are accelerated to a constant momentum. In this case, a linear relationship is seen between m/z and flight time (labeled ZOOM-TOF).

Description of Relationship Between m/z and Ion Flight Time for Constant Momentum Acceleration:

$$t_{det(@eft)} = \frac{4mv_{imp}}{zq_eE_M}$$

The equation above illustrates the dependence of flight time in the Zoom-TOF and the m/z of the ion detected under optimum focusing conditions (Enke and Dobson, 2007), where t(det) is the time of flight to the ion detector, m is the ion mass, v(imp) is the velocity imparted through the extraction procedure, z is the ion charge, q is the fundamental charge, and E(m) is the ion mirror potential. According to the above equation, operation of the instrument in Zoom-TOF mode results in a linear relationship between the time required for an ion to reach the detector and the m/z of the ion. Because m/z and ion flight time are linearly related in Zoom-TOF, as opposed to the quadratic dependence of m/z and flight time typically observed in TOFMS $(m/z)^2$, the interspacing of adjacent mass spectral peaks in Zoom-TOF is greater as compared to typical TOFMS (for the same range of m/z). This is a significant advantage that Zoom-TOF enjoys, particularly in the resolution of ions of large m/z values such as those created in biological mass spectrometry.

Ionization Techniques

It is to be understood that virtually any source of ions, or ion generator may be included in the devices and methods described herein. The ion source is the part of the mass spectrometer that ionizes the material under analysis (the analyte). Illustrative ion generation includes, but is not limited to electron ionization and chemical ionization used for gases and vapors. In chemical ionization sources, the analyte is ionized by chemical ion-molecule reactions during collisions in the source. Two additional illustrative techniques often used with liquid and solid biological samples include electrospray ionization and matrix-assisted laser desorption/ionization (MALDI).

Inductively coupled plasma (ICP) sources are used primarily for cation analysis of a wide array of sample types. Others ionization methods include glow discharge, field desorption (FD), fast atom bombardment (FAB), thermospray, desorption/ionization on silicon (DIOS), Direct Analysis in Real Time (DART), atmospheric pressure chemical ionization (APCI), secondary ion mass spectrometry (SIMS), spark ionization and thermal ionization (TIMS). Ion attachment ionization is an ionization technique that allows for fragmentation free analysis.

Surface Ionization Techniques and Zoom-TOF

Surface ionization techniques, such as matrix assisted laser desorption ionization (MADLI), create ions with a small and well defined initial spatial distribution that is often only micrometers in width. These sources provide a particularly effective source for Zoom-TOF because the ionization source itself provides an ion beam of small spatial dimensions, and thus would permit very high resolving powers. In addition, velocity variations along the extraction axis are relatively small, and have narrow temporal packet widths. Both of these characteristics make surface ionization techniques particularly suitable for generation of the focused ion beam needed for ZOOM-TOF operation.

Detector

The final element of the mass spectrometer is the detector. The detector records either the charge induced or the current produced when an ion passes by or hits a surface. In a scanning instrument, the signal produced in the detector during the course of the scan versus where the instrument is in the scan (at what m/Q) will produce a mass spectrum, a record of ions as a function of m/Q.

Typically, some type of electron multiplier is used, though other detectors including Faraday cups and ion-to-photon detectors are also used. Because the number of ions leaving the mass analyzer at a particular instant is typically quite small, considerable amplification is often necessary to get a signal. Microchannel plate detectors are commonly used in modern commercial instruments. In FTMS and Orbitraps, the detector consists of a pair of metal surfaces within the mass analyzer/ion trap region which the ions only pass near as they oscillate. No DC current is produced, only a weak AC image current is produced in a circuit between the electrodes. Other inductive detectors have also been described.

As previously stated, all TOF mass spectrometers being commercially built today operate in a constant-energy mode. When an ion with mass m, charge q, and zero initial velocity is accelerated in a uniform, static electric field E over a fixed distance d, the kinetic energy T it acquires is given by $$T=\tfrac{1}{2}mv^2=qEd$$

Since the work qEd performed on the ion is independent of its mass, the kinetic energy gained in the field E by any other ion accelerated from the same starting position over the same distance d, irrespective of its mass, would also be qEd ("constant-energy acceleration mode").

It follows from the preceding equation that the ion's speed v is $$v=\left(\frac{2qEd}{m}\right)^{1/2}$$

and its time-of-flight t over a field-free path length L is $$t=\frac{L}{v}=\frac{L}{(2qEd)^{1/2}}m^{1/2}\propto m^{1/2}$$

Consequently, a TOF mass spectrometer operating in constant-energy mode generates a mass spectrum whose mass scale is, to the first-order, proportional to the square of the flight-time, i.e., $t^2$, and whose mass-resolving power is half its time-resolving power, $$R_{CE}=m/\Delta m=\tfrac{1}{2}t/\Delta t$$

Generally, mass calibration in the constant-energy mode can be based on a polynomial in (m/z)1/2 of the form $$t=a\left(\frac{m}{z}\right)^{1/2}+b$$

where a and b are empirical constants that depend on the geometry, voltage, and timing of the instrument and that can be determined by running calibration samples.

Constant Momentum

When an ion with mass m, charge q, and zero initial velocity is accelerated in a uniform, static electric field E for a fixed time $\tau$, the momentum p it acquires is given by $$p=mv=qE\tau$$

The pulse duration t must be shorter than the time it takes for the ion to exit the acceleration region. Since the impulse $qE\tau$ received by the ion is independent of its mass, the momentum gained in the field E by any other ion accelerated over the time $\tau$, irrespective of its mass or starting position, would also be $qE\tau$ ("constant-momentum acceleration mode"). It readily follows from the preceding equation that the ion speed v is $$v=\frac{qE\tau}{m},$$

and its time-of-flight t over a path length L is $$t=\frac{L}{v}=\frac{L}{qE\tau}m\propto m.$$

Hence, a TOF mass spectrometer operating in this constant-momentum mode generates a mass spectrum whose mass scale is to the first-order linearly proportional to the flight-time t and whose mass resolving power equals its time resolving power, i.e., $R_{CM}$, m/Δm equals t/Δt. Therefore, on a TOF instrument capable of operating in both constant-momentum and constant energy accelerating modes, the mass resolving power in the former mode should be twice that in the latter mode, i.e., $R_{CM}=2\times R_{CE}$, if the time spread is the same in both cases.

Based the equations above, a linear polynomial in m/z of the form $$t=c\frac{m}{z}+d$$

should provide suitable mass-calibration in the constant-momentum mode.

EXAMPLES

Figure 2:
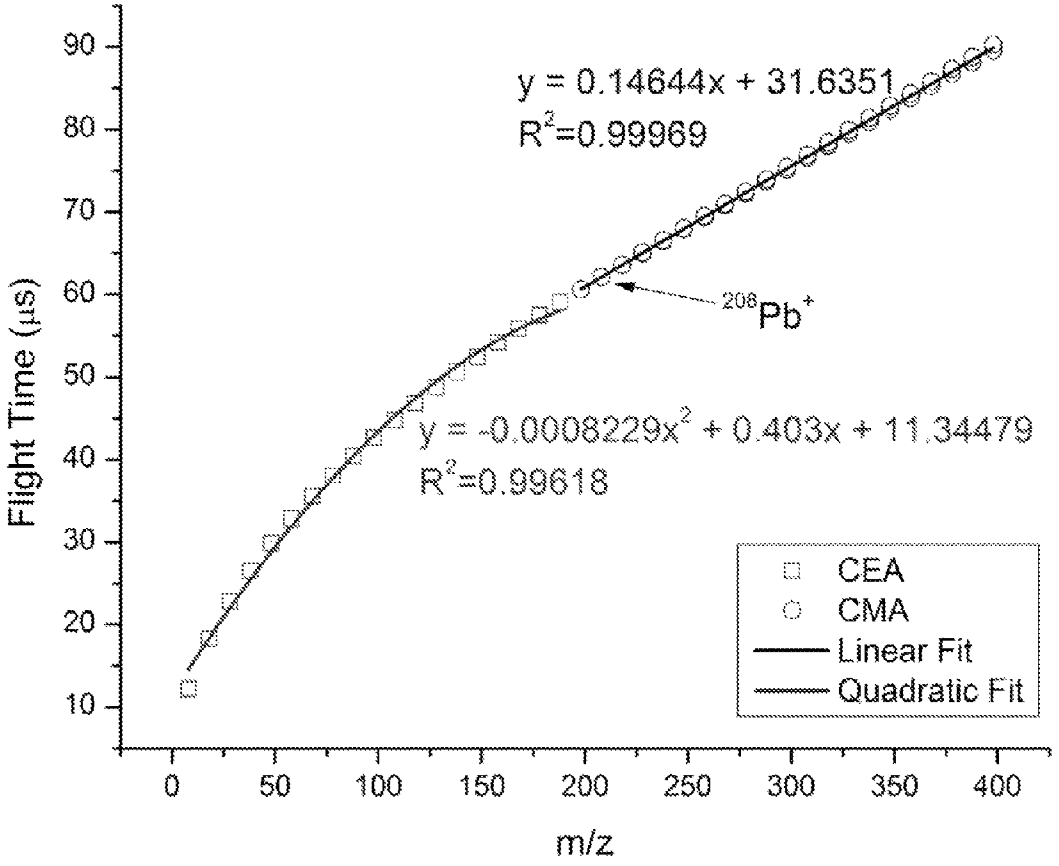
FIG. 2 is a graph showing the dependence of ion flight time on m/z according to a modified Monte Carlo simulation for a 1 m Zoom-TOFMS instrument showing ion detection time for different m/z-ratios under a single set of extraction conditions.
Figure 3:
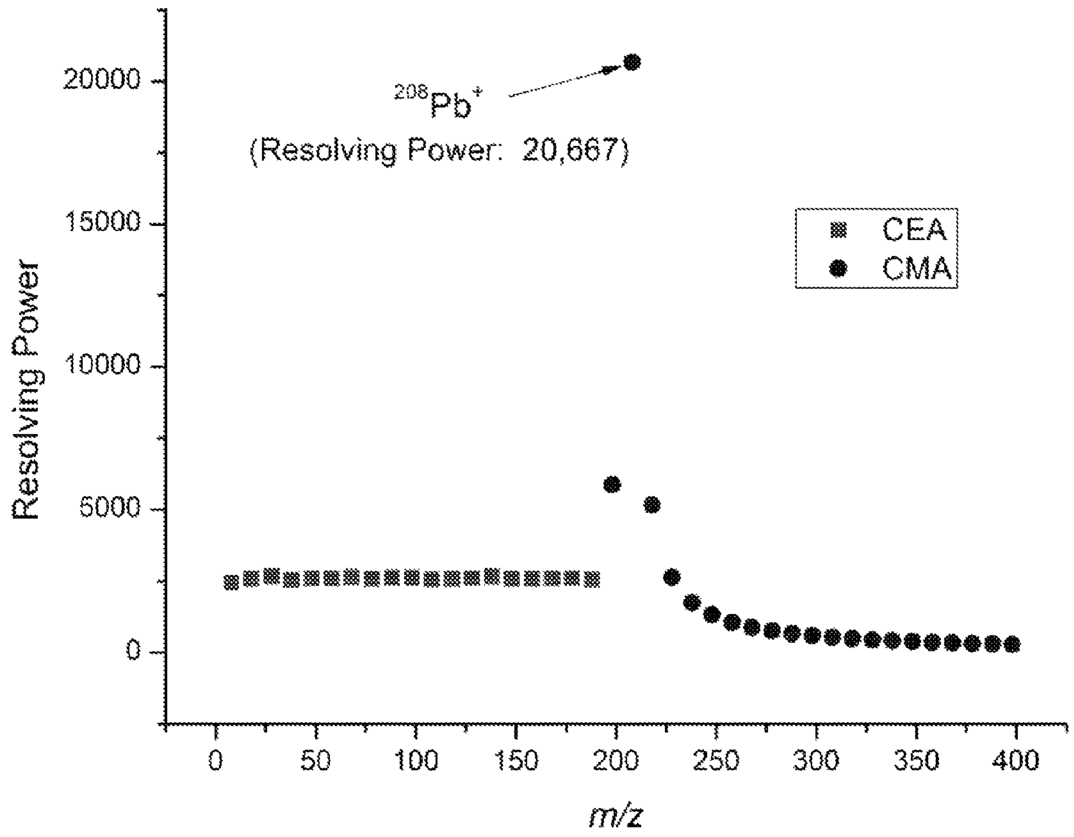
FIG. 3 is a graph showing the resolving power as a function of m/z, for conditions exhibiting a maximum resolving power at m/z=208, using the extraction conditions and modified Monte Carlo simulation parameters used to generate FIG. 2.

Monte Carlo calculations show the linear relationship of m/z to time-of-flight for constant momentum acceleration (CMA) versus the quadratic relationship between m/z and time-of-flight for constant energy acceleration (CEA) (see FIG. 2). The same calculations show the resolving power as a function of m/z for CMA and CEA (see FIG. 3). The simulation conditions were selected to provide a maximum in resolving power at $^{208}Pb^{+}$; that is, the m/z=208 would be considered the target m/z for this particular Zoom-TOF experiment. Conditions are selected so that the target m/z represents the lowest m/z value for which all simulated ions are accelerated to a constant momentum. The sharpness of the maximum demonstrates the narrow window in which ions are highly focused with the Zoom-TOF mode of operation. For optimal performance in ZOOM-TOF mode ions should experience the extraction pulse for as long as possible, and therefore gain the highest amount of energy possible, without exiting the extraction region.

Figure 5:
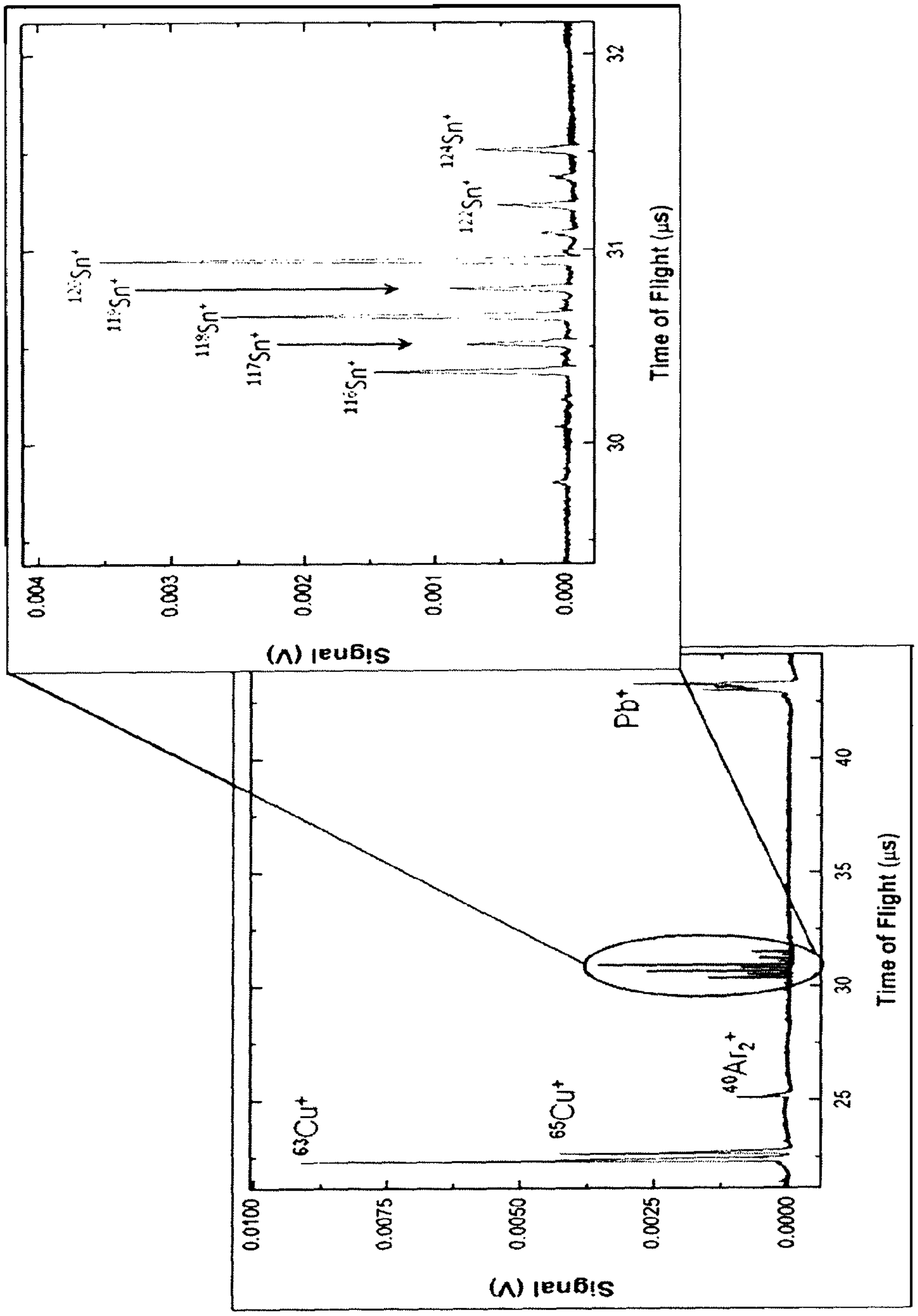
FIG. 5 is a graph showing a first TOF mass spectra with an inset second zoom-TOF spectra taken under conditions that focus on isotopes of tin, showing a resolving power of 1715 for $^{118}Sn^{+}$, further showing that those m/z that fall outside the focus target have comparatively lower resolving powers.
Figure 6A:
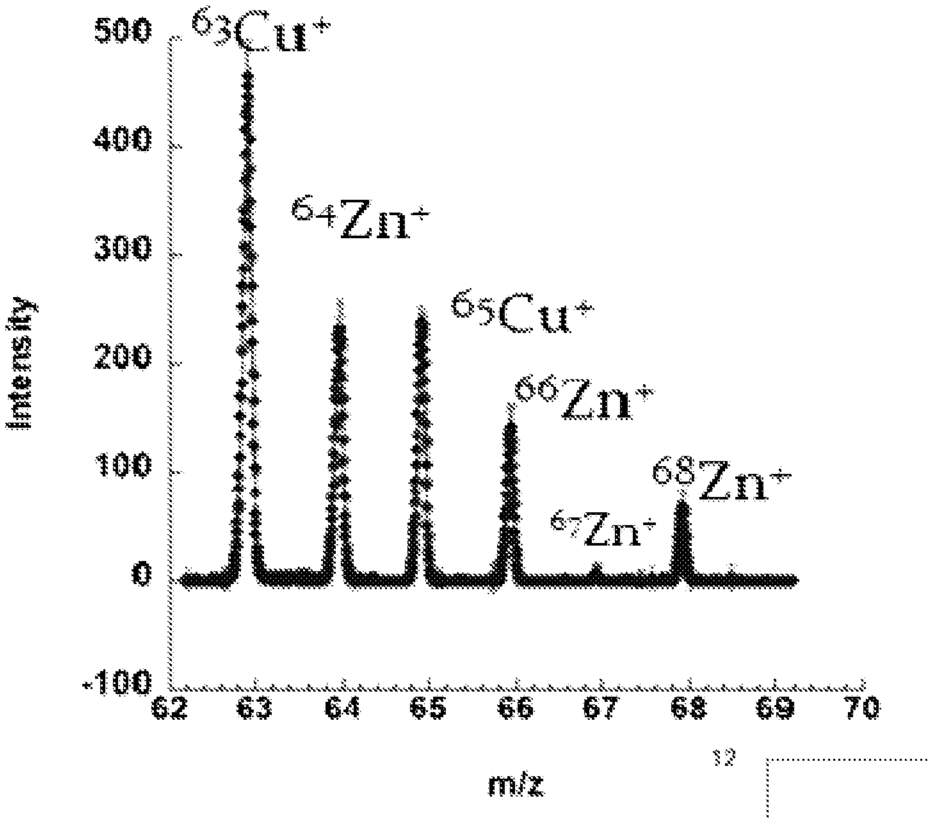
FIG. 6(A)-(C) show three spectra taken on a prototype 0.3 m DOFMS instrument with a time of flight detector located at 0.35 m; (A) shows a resolving power at $^{63}Cu^{+}$ of 600 for DOF, (B) shows a resolving power at $^{63}Cu^{+}$ of 600 for TOF, and (C) shows a resolving power at $^{63}Cu^{+}$ of 3900 for zoom-TOF.
Figure 6B:
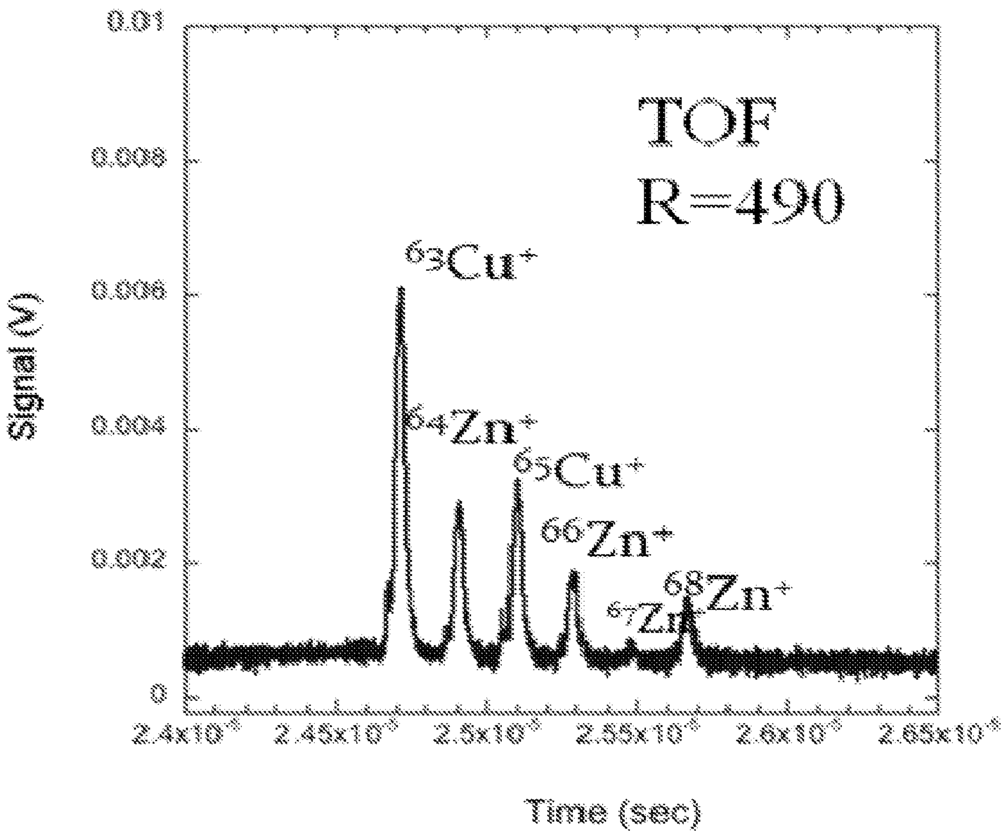
Figure 6C:
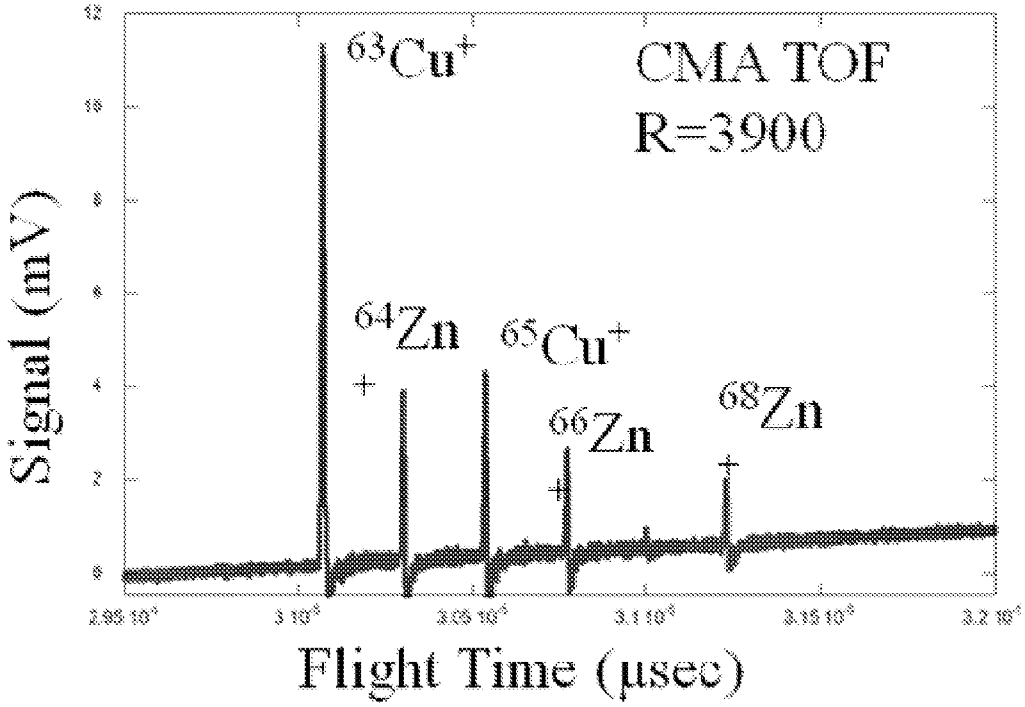

The results from a constant momentum acceleration time of flight spectrum taken on an instrument with a 35 cm field free region are shown in FIG. 5. Only the isotopes of tin are focused in this spectrum and a resolving power of 1715 is seen for $^{118}Sn^{+}$. This result experimentally demonstrates the narrow range of ion focus predicted with simulations. In this example, the isotopes of Sn are focused in Zoom-TOF mode. Those ions with m/z that fall outside the focus target have comparatively lower resolution.

Three spectra which show a comparison of DOF, conventional TOF, and ZOOM-TOF for analysis of ions generated from a brass sample with a dc glow discharge source are shown in FIGS. 7(A), 7(B), and 7(C). All three spectra were taken on a prototype 0.3 m DOFMS instrument with a time of flight detector located at 0.35 m. The resolving power at $^{63}Cu^{+}$ is 600 for DOF, 3900 for ZOOM-TOF TOF and 490 for CE TOF.

Figure 4:
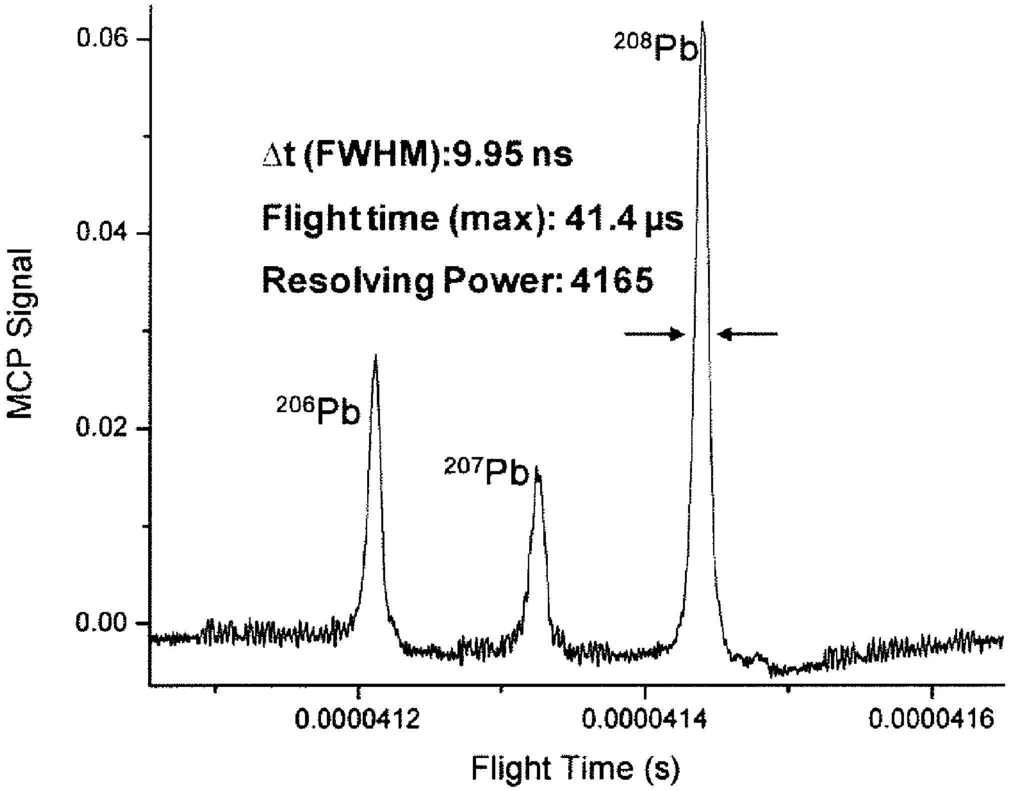
FIG. 4 is a graph showing data obtained from a prototype DOFMS instrument using a TOF detector for a sample containing lead, the prototype exhibited a resolving power of 4165.

The resolution of ions of Pb isotopes resolved by a prototype DOFMS instrument with a TOF detector (Zoom-TOF) is shown in FIG. 4. As can be seen, a resolving power of over 4000 is observed. In this example the prototype instrument has a flight path length much shorter than most TOFMS instruments and employs an ion source that produces a beam of ions that has an extended spatial distribution. Therefore, this does not represent the best resolution that could be obtained if a traditional TOF instrument were modified to provide the Zoom-TOF feature. Modification of a traditional time-of-flight instrument would yield even greater resolution enhancement available under Zoom-TOF operation. The modifications involved include the installation of a single field mirror of appropriate length and an extraction region suitable for both constant momentum and constant energy acceleration.

What is claimed is:

1. A multi-mode mass spectrometer comprising an ion accelerator, an ion mirror, and an ion detector, wherein in a first mode, the mass spectrometer is configured so that the ions are accelerated with constant momentum and the ion mirror is configured to reflect the ions with a linear field; and in a second mode, the mass spectrometer is configured so that the ions are accelerated with constant energy and the ion mirror is configured to reflect the ions with a conventional field.

2. The mass spectrometer of claim 1 wherein the first mode and the second mode are switchable.

3. The mass spectrometer of claim 1 wherein the ions are accelerated from an extraction region from a substantially orthogonal ion beam.

4. The mass spectrometer of claim 1 further comprising a quadrupole doublet, where the quadrupole doublet is configured to focus an ion beam in two dimensions prior to the accelerator.

5. The mass spectrometer of claim 4 wherein the quadrupole doublet is polarized using a dc voltage.

6. The mass spectrometer of claim 5 wherein the first quadrupole of the quadrupole doublet is configured to transform the ion beam from three dimensions into substantially two dimensions.

7. The mass spectrometer of claim 5 wherein the second quadrupole of the quadrupole doublet is configured to decrease ion loss from the ion beam in two substantially orthogonal directions.

8. The mass spectrometer of claim 1 wherein the ion mirror is configured to reflect the ions towards the ion detector in a collimated beam in the first mode.

9. The mass spectrometer of claim 1 wherein the ion mirror is configured to reflect the ions towards the ion detector in a focused beam in the second mode.

10. The mass spectrometer of claim 1 wherein in the first mode the ions are included in a predetermined range of mass/charge.

11. The mass spectrometer of claim 1 wherein in the second mode the ions are included in a predetermined range of mass/charge.

12. The mass spectrometer of claim 1 wherein the detector is a time of flight detector.

13. The mass spectrometer of claim 3 wherein the extraction region comprises a plurality of parallel planar elements selected from the group consisting of:

a rear repeller element having a solid or gridded middle section;

an intermediate element having a gridded middle section;

an exit element having a gridded middle section;

one or more additional intermediate elements; and combinations thereof;

wherein insulating spacers set the distance between each of the elements; and the planar elements are in electrical communication via a series of resistors having the voltage applied to the gridded intermediate element selectable by the operator or system.

14. A method for analyzing the mass of a sample, the method comprising the steps of ionizing the sample into ions;

accelerating at least a portion of the ions with constant energy;

reflecting the ions with constant energy using an ion mirror having a conventional field;

detecting the ions;

accelerating a range of ions having a predetermined mass/charge with constant momentum;

reflecting the ions with constant momentum using an ion mirror having a linear field; and detecting the range of ions.

* * * * *